E. ESTEP.
DRIVING MECHANISM FOR SIDE DELIVERY RAKES AND THE LIKE.
APPLICATION FILED APR. 28, 1916.
1,285,963.
Patented Nov. 26, 1918.
2 SHEETS—SHEET 1.
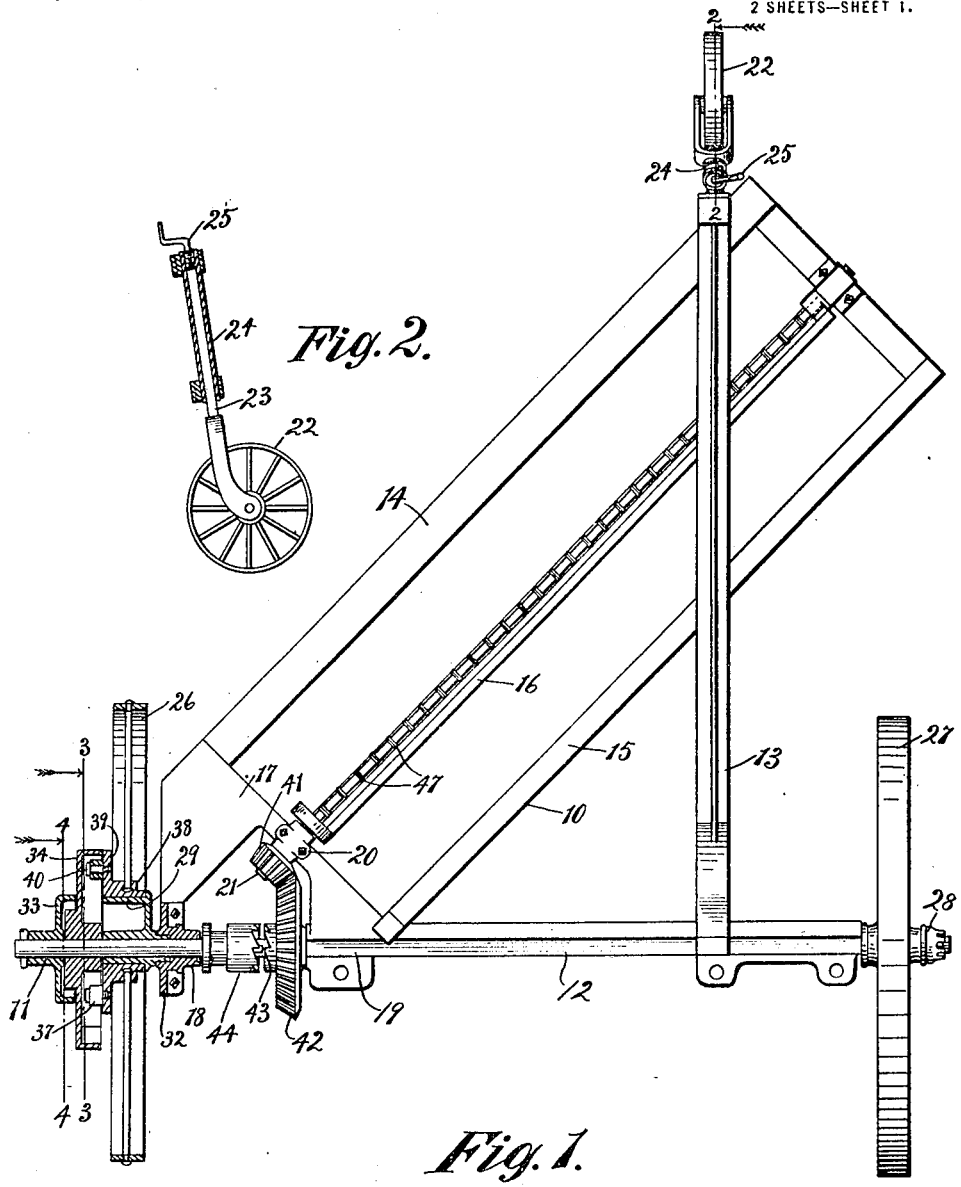
Inventor:
Ezra Estep
By Gillson & Gillson Attys.

E. ESTEP.
DRIVING MECHANISM FOR SIDE DELIVERY RAKES AND THE LIKE.
APPLICATION FILED APR. 28, 1916.

1,285,963.

Patented Nov. 26, 1918.
2 SHEETS—SHEET 2.

Inventor:
Ezra Estep

UNITED STATES PATENT OFFICE.

EZRA ESTEP, OF SANDWICH, ILLINOIS, ASSIGNOR TO SANDWICH MANUFACTURING CO., OF SANDWICH, ILLINOIS, A CORPORATION OF ILLINOIS.

DRIVING MECHANISM FOR SIDE-DELIVERY RAKES AND THE LIKE.

1,285,963.

Specification of Letters Patent. Patented Nov. 26, 1918.

Application filed April 28, 1916. Serial No. 94,094.

*To all whom it may concern:*

Be it known that I, EZRA ESTEP, a citizen of the United States, and resident of Sandwich, county of Dekalb, and State of Illinois, have invented certain new and useful Improvements in Driving Mechanism for Side-Delivery Rakes and the like, of which the following is a specification and which are illustrated in the accompanying drawings, forming a part thereof.

The invention relates to harvesting machines and more particularly to those having operative parts which are driven from the ground wheels and which may be adjusted to operate at different levels. In certain classes of harvesting machines, and especially in side delivery rakes having raking elements which are inclined to the line of travel of the machine, difficulty has been experienced in providing a satisfactory vertical adjustment of the operative parts and a driving connection between these parts and the ground wheels without weakening the construction or unwarrantably complicating the mechanism.

The object of the invention is to provide a driving mechanism for harvesting machines which will permit of a vertical adjustment of the machine frame and the operative parts mounted therein, through a considerable range of movement, while still maintaining a substantial construction and without unduly complicating the mechanism. To this end, the invention contemplates the use of a rotating axle which occupies a fixed position in the machine frame and which is extended through the carrying wheel, but having the carrying wheel mounted upon an eccentric bushing with provision for the angular adjustment of the bushing and for communicating motion between the carrying wheel and axle in any position to which the bushing may be adjusted.

Figures 3, 4:
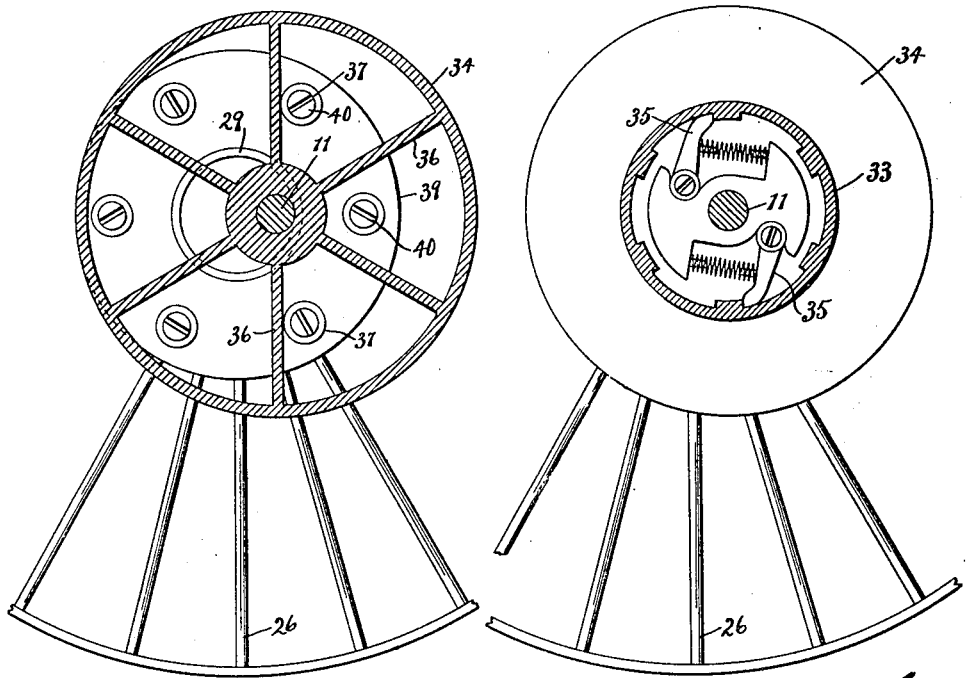
Figures 5, 6:
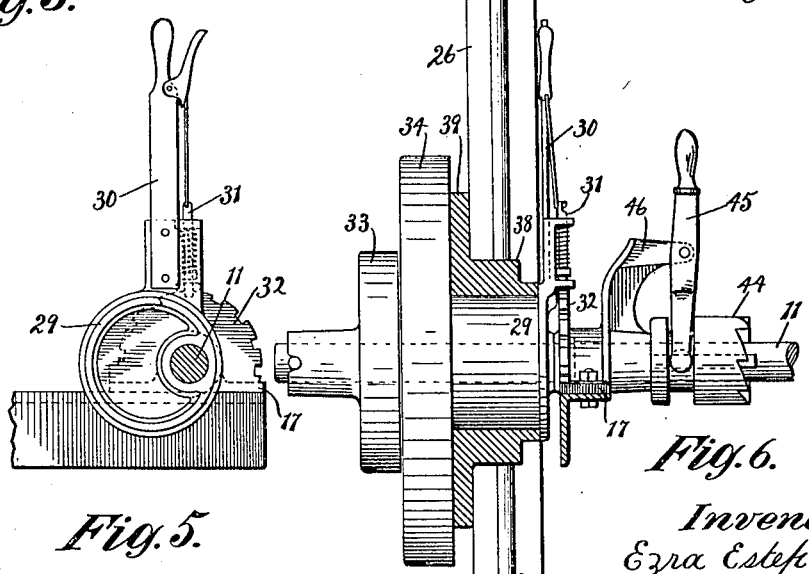

In the accompanying drawings,

Figure 1 is a plan view of a side delivery rake equipped with a form of the improved mechanism provided by the invention, some of the parts being shown in section and other parts being omitted for the sake of clearness, Fig. 2 is a detail sectional view taken on the line 2—2 of Fig. 1, Figs. 3 and 4 are sectional views taken on the lines 3—3 and 4—4, respectively, of Fig. 1, Fig. 5 is a detail side view of the machine with the axle shown in section and with the adjacent carrying wheel removed, and Fig. 6 is a detail front elevation of the machine partly in section.

When the invention is to be employed in connection with a side delivery rake, the frame of the machine, generally designated 10, may be substantially triangular in shape with the axle 11 extending across the front end of the same. As shown, the frame 10 comprises a front transverse member 12, a longitudinal side member 13 and a pair of oblique members 14 and 15. The front frame member 12 extends over and covers the axle 11 for a considerable portion of its length. The side member 13 arches over the raking reel 16, and the two oblique frame members 14, 15, are located at opposite sides of the reel and are connected at their forward ends by a bracket or casting 17. This bracket also connects with the front transverse frame member 12 and it provides journal bearings 18, 19, for the axle 11 and a journal bearing 20 for the forward end of the reel shaft 21.

A caster wheel 22, of usual construction, extends under the rear end of the longitudinal frame member 13. This caster wheel serves to permit the vertical adjustment of the rear end of the reel 16 in a well known manner. As shown, the caster wheel spindle 23 extends into an upright sleeve 24, and is vertically adjusted therein by a screw shaft 25 which enters the higher end of the sleeve 24 and bears upon the top of the spindle.

The main drive wheels 26 and 27 are mounted upon the ends of the axle 11 at opposite sides of the frame 10. Both of these wheels are preferably arranged for driving the axle in a forward direction only and one of the wheels, as 27, is connected with the axle through a ratchet hub 28, as usual.

The wheel 26, on the other hand, turns upon a bushing 29 and this bushing is eccentrically mounted on the axle 11. The elevation of that corner of the frame 10 which is adjacent the carrying wheel 26 is accordingly adjusted by turning the bushing 29. For this purpose a hand lever 30 is applied to the inner end of the bushing 29 and is equipped with a pawl 31 which plays over a toothed segment 32 formed upon an adjacent part of the bracket 17 (Figs. 5 and 6).

Owing to the eccentric relation between the ground wheel 26 and axle 11, an intermediate mechanism is preferably employed for transmitting motion from the wheel to the axle. As shown, a ratchet hub 33 is fixed upon the axle 11 outside of the wheel 26 and a pawl plate 34 is loosely mounted on the axle between the hub 33 and the wheel. The outer face of the pawl plate 34 is equipped with pawls, as 35 (Fig. 4), and these pawls coöperate with the ratchet teeth of the hub 33 for rotating the axle 11 when the pawl plate 34 is turned in a forward direction. The inner face of the pawl plate 34 is constructed with a series of equally spaced radial ribs or webs 36 (Fig. 3). These ribs coöperate with rollers 37 carried by the wheel 26 for effecting the rotation of the pawl plate by the turning of the wheel. The rollers 37 are preferably equal in number with the number of the ribs or webs 36 and each of the rollers is engaged with one of the ribs or webs during a part of each revolution of the wheel 26. When six of the ribs or webs 36 and rollers 37 are employed, a continuous and substantially uniform rotation of the pawl plate 34 at the same rate of movement with the wheel 26 is obtained. As shown, the rollers 37 are arranged in an annular series and project outwardly from the face of the wheel 26. For this purpose the hub, as 38, of the wheel 26 is enlarged at one end forming a face plate 39 against which the rollers 37 are rotatably secured, as by mounting each roller upon a stud 40 which is fixed in the said face plate.

As the axle 11 and reel shaft 21 have a fixed relation in the frame 10, any convenient mechanism may be employed for communicating motion from one to the other. As shown, a beveled pinion 41 is fixed upon the forward end of the reel shaft 21 and this beveled pinion is in constant mesh with a beveled gear 42 which is loosely mounted upon the axle. The beveled gear 42 is formed with a clutch face 43 and a clutch 44 is splined upon the axle in front of the said gear for engagement with the clutch face 43 of the gear, whenever the reel shaft 21 is to be driven. Preferably a shipper lever 45 is provided for operating the clutch 44. In the construction shown, the bracket 17 is formed with an upstanding arm 46 which extends inwardly over the clutch 44 and provides a support upon which the shipper lever 45 is pivotally secured.

While the turning of the eccentric bushing 29 serves for adjusting the elevation of the reel 16 at its forward end, a vertical adjustment of the caster wheel 22 serves for changing the elevation of the rear end of the reel. The proximity with which the rack teeth, as 47, operate with reference to the ground may accordingly be adjusted throughout the length of the reel 16 by swinging the hand lever 30 and turning the screw shaft 25. Furthermore, the construction is quite as substantial as if both of the ground wheels 26, 27, were directly mounted on the axle 11 and the arrangement lends itself to the use of the same simple driving connection between the axle 11 and reel 16 as has been heretofore employed when no vertical adjustment of the forward end of the reel has been permitted.

I claim as my invention,—

1. In a harvesting machine, in combination, a frame, carrying wheels at opposite sides of the frame, a straight rotating axle extending transversely through the frame and continuously through both of the said carrying wheels, the axle being eccentric with reference to one of the said wheels and concentric with the other carrying wheel at all times, and a driving connection between the said eccentric wheel and the axle.

2. In a harvesting machine, in combination, a frame, carrying wheels at opposite sides of the frame, a straight rotating axle extending transversely through the frame and continuously through both of the said carrying wheels, the said axle being concentric with one of the said carrying wheels at all times, and a shiftable eccentric driving connection between the other carrying wheel and the axle.

3. In a harvesting machine, in combination, a frame, carrying wheels at opposite sides of the frame, a straight rotating axle extending transversely through the frame and continuously through both of the said carrying wheels, the said axle being eccentric to one of the said wheels and concentric with the other carrying wheel at all times, a stud projecting from the face of the said wheel which is eccentric to the axle, and a member mounted on the axle and having a radial shoulder in the path of the said stud.

4. In a harvesting machine, in combination, a frame, carrying wheels at opposite sides of the frame, a straight rotating axle extending transversely through the frame and continuously through both of the said carrying wheels, the said axle being eccentric to one of the said wheels and concentric with the other carrying wheel at all times, a stud projecting from the face of the said wheel which is eccentric to the axle, a disk rotatably mounted on the axle adjacent the last-mentioned wheel and having a radial shoulder in the path of the said stud, and ratchet and pawl mechanism connecting the disk and axle.

5. In a harvesting machine, in combination, a frame, a carrying wheel, a rotating axle journaled in the frame and extending eccentrically through the wheel, an annular series of equally spaced studs projecting from the face of the wheel and a member mounted on the axle and having a series of equally spaced radial shoulders each projecting into the path of one of the said studs.

6. In a harvesting machine, in combination, a frame, a carrying wheel, a rotating axle journaled in the frame and extending eccentrically through the wheel, an annular series of equally spaced studs projecting from the face of the wheel, a disk rotatably mounted on the axle adjacent the wheel and having a series of equally spaced radial shoulders each projecting into the path of one of the said studs, and ratchet and pawl mechanism connecting the disk and axle.

7. In a harvesting machine, in combination, a frame, a rotating axle journaled in the frame, a bushing eccentrically pivoted on the axle, a carrying wheel turning on the bushing, an annular series of equally spaced studs projecting from the face of the wheel, a member mounted on the axle and having a series of equally spaced radial shoulders each extending into the path of one of the said studs and means for adjustably turning the bushing about the axle.

8. In a harvesting machine, in combination, a frame, a rotating axle journaled in the frame, a bushing eccentrically pivoted on the axle, a carrying wheel turning on the bushing, an annular series of equally spaced studs projecting from the face of the wheel, a disk rotatably mounted on the axle and having a series of equally spaced radial shoulders each projecting into the path of one of the said studs, ratchet and pawl mechanism connecting the disk and axle and means for adjustably turning the bushing about the axle.

9. In a side delivery rake, in combination, a frame, a rotating axle and an oblique rake operating shaft having a fixed relation in the frame, gears connecting the axle and shaft at one side of the frame, a bushing eccentrically pivoted on the axle at the same side of the frame with the gears, a carrying wheel turning on the bushing, an annular series of equally spaced studs projecting from the face of the said carrying wheel, a disk rotatably mounted on the axle and having a series of equally spaced radial shoulders each projecting into the path of one of said studs, ratchet and pawl mechanism connecting the disk and axle, means for adjustably turning the bushing about the axle, a second carrying wheel mounted on the axle at the remote side of the frame from the said gears, and a vertically adjustable caster wheel supporting the frame adjacent the end of the rake operating shaft remote from the said gears.

10. In a side delivery rake, in combination, a frame, carrying wheels at opposite sides of the frame, a rotating axle extending transversely through the frame and continuously through both of the said carrying wheels, an oblique rake-operating shaft, the axle and shaft having a fixed relation in the frame and the axle being concentric with one of the said carrying wheels at all times, a shiftable eccentric driving connection between the other of the said carrying wheels and the axle, a gear connection between the axle and shaft at one side of the frame, and a vertically adjustable caster wheel supporting the frame adjacent the end of the said rake-operating shaft which is remote from the said gear connection.

EZRA ESTEP.

Copies of this patent may be obtained for five cents each, by addressing the "Commissioner of Patents, Washington, D. C."